(12) United States Patent
Freeman (10) Patent No.: US 9,354,632 B2
(45) Date of Patent: May 31, 2016

(54) SYSTEMS AND METHODS FOR SIGNAL SELECTION AND FAULT DETECTION

(75) Inventor: Robert Erik Freeman, Seattle, WA (US)

(73) Assignee: The Boeing Company, Chicago, IL (US)

( * ) Notice: Subject to any disclaimer, the term of this patent is extended or adjusted under 35 U.S.C. 154(b) by 997 days.

(21) Appl. No.: 13/428,713

(22) Filed: Mar. 23, 2012

(65) Prior Publication Data

US 2013/0253859 A1 Sep. 26, 2013

(51) Int. Cl.
*G05B 23/00* (2006.01)
*G05B 23/02* (2006.01)
*G05B 9/03* (2006.01)

(52) U.S. Cl.
CPC .............. *G05B 23/0205* (2013.01); *G05B 9/03* (2013.01)

(58) Field of Classification Search
CPC ............................. G05B 23/0205; G05B 9/03
See application file for complete search history.

(56) References Cited

U.S. PATENT DOCUMENTS

| 4,276,648 | A | | 6/1981 | Tomlinson |
| 4,472,806 | A | * | 9/1984 | Blair .............................. 714/820 |
| 5,710,776 | A | | 1/1998 | Tomlinson et al. |
| 2007/0033435 | A1 | * | 2/2007 | Stange et al. .................... 714/15 |

* cited by examiner

*Primary Examiner* — Mischita Henson
(74) *Attorney, Agent, or Firm* — Armstrong Teasdale LLP (57) ABSTRACT

A signal selection and fault detection system is provided. The system includes four input equalization circuits each configured to receive an input signal from an associated sensor, wherein the input signal is indicative of a parameter measured by the associated sensor, and output an equalized signal based on the received input signal. The system further includes a five-input output selection circuit coupled to the four input equalization circuits, the five-input output selection circuit configured to receive an equalized signal from each of the four input equalization circuits, receive a previous frame output signal, and select an output signal from the four equalized signals and the previous frame output signal.

20 Claims, 7 Drawing Sheets

SYSTEMS AND METHODS FOR SIGNAL SELECTION AND FAULT DETECTION

BACKGROUND

The field of the disclosure relates generally to electronic signal processing, and more specifically, to signal selection and fault detection processing.

In redundant channel signal processing, multiple sensors each sense the same parameter and provide a corresponding output signal. Processing circuitry receives the redundant output signals and selects a particular output signal and/or combination of output signals based on the logic and/or programming of the processing circuitry. The processing circuitry is designed such that the selected signal is a signal most likely to be representative of the actual parameter. Such signal processing is utilized, for example, to measure one or more parameters related to the operation of an aircraft.

In the event that one or more sensors may fail to operate properly, at least some known redundant channel signal processing systems identify and isolate input signals from failing sensors. For example, failing sensors may be isolated in aircraft flight control systems that are relatively susceptible to oscillatory transients that may affect signals output by one or more sensors onboard an aircraft.

However, at least some known redundant channel signal processing systems may be unable to effectively deal with a common mode failure, in which a plurality of sensors fail simultaneously. Further, at least some known redundant channel signal processing systems are unable to effectively prevent oscillatory failures in one or more sensors from reaching an output signal. Moreover, at least some known redundant channel signal processing systems have a relatively small number of inputs, and as such, the processing systems can only process signals from a relatively small number of sensors.

BRIEF DESCRIPTION

In one aspect, a signal selection and fault detection system is provided. The system includes four input equalization circuits each configured to receive an input signal from an associated sensor, wherein the input signal is indicative of a parameter measured by the associated sensor, and output an equalized signal based on the received input signal. The system further includes a five-input output selection circuit coupled to the four input equalization circuits, the five-input output selection circuit configured to receive an equalized signal from each of the four input equalization circuits, receive a previous frame output signal, and select an output signal from the four equalized signals and the previous frame output signal.

In another aspect, a sensor system onboard an aircraft is provided. The sensor system includes four sensors each configured to measure an operational parameter and produce an input signal indicative of the measured parameter, and a signal selection and fault detection system coupled to the four sensors and including four input equalization circuits each configured to receive the input signal from an associated sensor of the four sensors, and output an equalized signal based on the received input signal. The signal selection and fault detection system further includes a five-input output selection circuit coupled to the four input equalization circuits, the five-input output selection circuit configured to receive an equalized signal from each of the four input equalization circuits, receive a previous frame output signal, and select an output signal from the four equalized signals and the previous frame output signal.

In yet another aspect, a method of selecting an output signal is provided. The method includes receiving, at each of four input equalization circuits, an input signal from an associated sensor, the input signal indicative of a parameter measured by the associated sensor, equalizing each of the input signals to generate a corresponding equalized signal, receiving, at a five-input output selection circuit, each of the four equalized signals, receiving, at the five-input output selection circuit, a previous frame output signal, and selecting, using the five-input output selection circuit, an output signal from the four equalized signals and the previous frame output signal.

The features, functions, and advantages that have been discussed can be achieved independently in various embodiments or may be combined in yet other embodiments, further details of which can be seen with reference to the following description and drawings.

DETAILED DESCRIPTION

The systems and methods described herein enable selection of an output signal that is most likely to be representative of an actual value of a parameter measured by a plurality of sensors. The signal selection and fault detection (SSFD) system described herein includes four input equalization circuits that each equalize an input signal received from an associated sensor. The four equalized signals are received at a five-input output selection circuit, along with a previous frame output signal. The five-input output selection circuit selects an output signal for the SSFD system from one of the four equalized signals and the previous frame output signal.

At least some signal processing systems as are known in the art and referenced herein are described in U.S. Pat. No. 5,710,776, the contents of which are hereby incorporated by reference in its entirety.

Technical effects of the methods and systems described herein include at least one of: (a) receiving four input signals from associated sensors, the input signal indicative of a parameter measured by the associated sensor; (b) equalizing each of the input signals to generate a corresponding equalized signal; (c) receiving each of the four equalized signals;

(d) receiving a previous frame output signal; and (e) selecting an output signal from the four equalized signals and the previous frame output signal.

Figure 1:
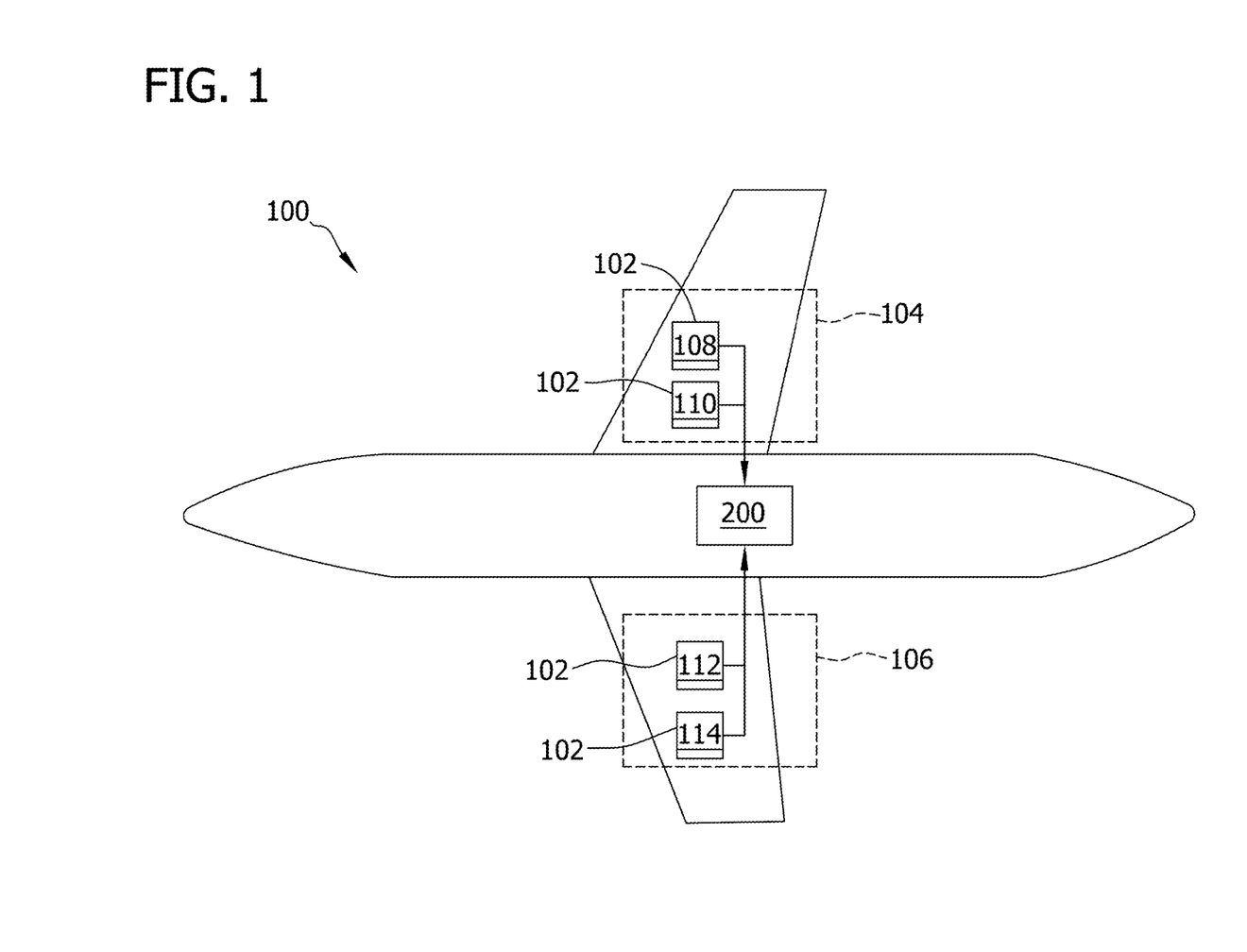
FIG. 1 is a schematic diagram of an exemplary sensor system that may be used with an aircraft.

FIG. 1 is a schematic diagram of an exemplary sensor system 100 that may be used with an aircraft. As used herein, an aircraft may be any vehicle and/or system in which the embodiments described herein may be implemented. For example, an aircraft may be an airplane, unmanned aerial vehicles, missile, ordnance, glider, helicopter, balloon, or any other object that travels.

In the exemplary embodiment, sensor system 100 includes a plurality of sensors 102. Specifically, sensor system 100 includes a first pair 104 of line replaceable units (LRUs), and a second pair 106 of LRUs. The first pair 104 includes a first inertial reference unit 108 (IRU) and a first attitude and heading reference unit 110 (AHRU), and the second pair 106 includes a second IRU 112 and a second AHRU 114. Alternatively, sensor system 100 may include any suitable number and arrangement of sensors 102. In the exemplary embodiment, IRUs 108 and 112 and AHRUs 110 and 114 measure any suitable parameters relevant to the operation of the aircraft, such as flight critical sensor data including, but not limited to, aircraft body accelerations, angular rates, pitch attitude, roll attitude, groundspeed, track angle, heading, for example. Further, sensors 102 are not limited to line replaceable units, but may include any sensors suitable for use with system 100. For example, in one embodiment, sensors 102 detect a speedbrake lever position.

Sensors 102 each measure the same parameter and output a corresponding signal to a signal selection and fault detection (SSFD) system 200. System 200 is utilized for redundancy management of signals received from sensors 102. Specifically, as described in detail below, based on the signals received from sensors 102, system 200 selects the signal that is most likely to be representative of the actual value of the operative parameter measured by sensors 102.

System 200 also detects failure of one or more of sensors 102 (i.e., a fault). For example, sensors 102 may fail due to oscillatory transients, electrical failure, and/or equipment failure. Further, each of first pair 104 and/or second pair 106 may be located on a respective shelf (not shown) in the aircraft. Accordingly, if one shelf collapses, both sensors 102 (i.e., first pair 104 or second pair 106) on the collapsed shelf may fail simultaneously, resulting in common mode failure. Once one or more faults are detected, system 200 removes the corresponding signal from the signal selection process, as described in detail below.

Figure 2:
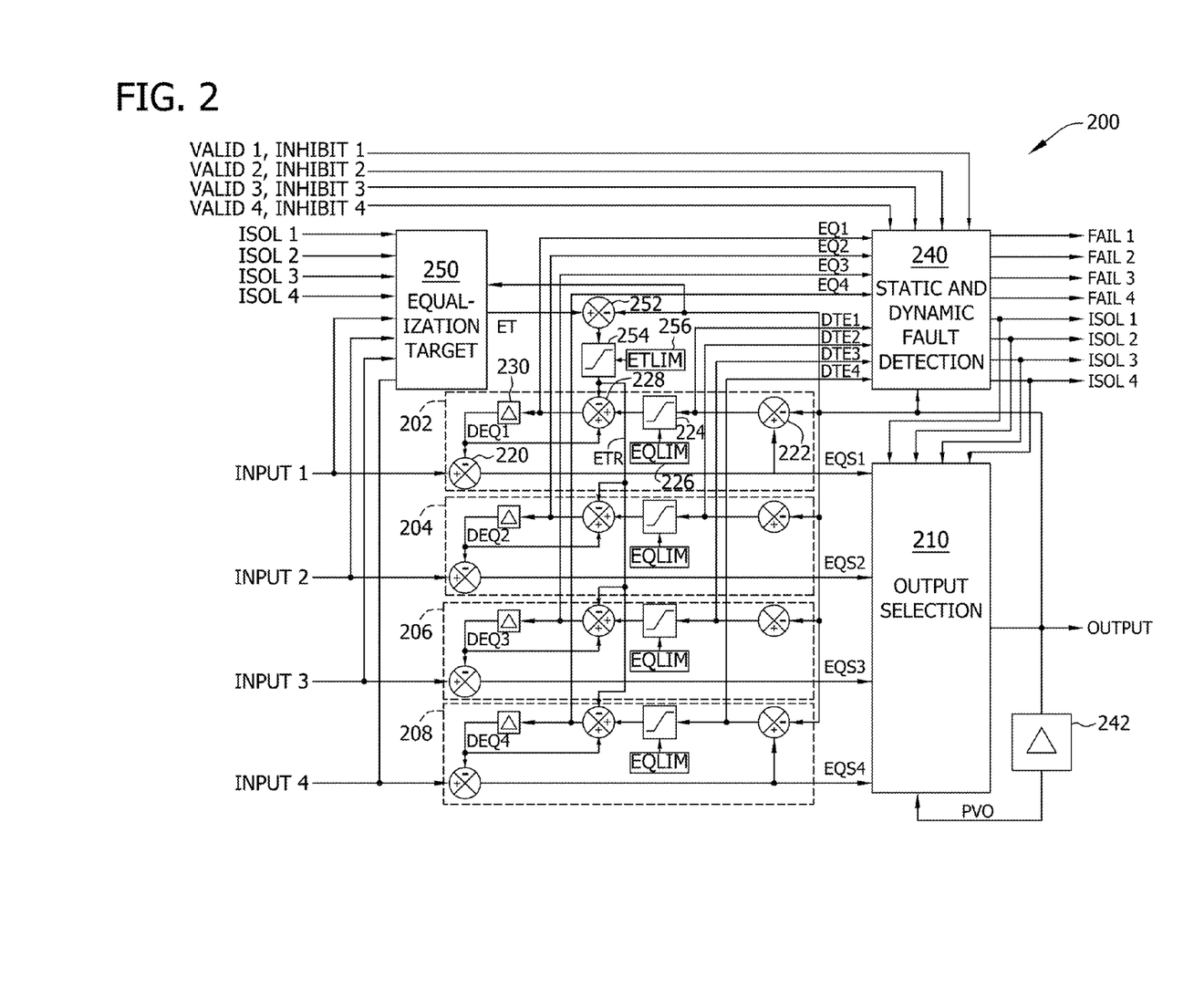
FIG. 2 is a schematic diagram of an exemplary signal selection and fault detection (SSFD) system that may be used with the aircraft shown in FIG. 1.

FIG. 2 is a block diagram of an exemplary signal selection and fault detection (SSFD) system 200 that may be used with sensor system 100 (shown in FIG. 1). In the exemplary embodiment, system 200 includes four input signal equalization circuits 202, 204, 206, and 208 that receive signals from first IRU 108, first AHRU 110, second IRU 112, and second AHRU 114, respectively (all shown in FIG. 1). That is, INPUT1 is a signal output from first IRU 108, INPUT2 is a signal output from first AHRU 110, INPUT3 is a signal output from second IRU 112, and INPUT4 is a signal output from second AHRU 114. INPUT1, INPUT2, INPUT3, and INPUT4 are all signals representative of the same parameter. As described herein, system 200 selects for an output a signal that is most likely to be representative of the actual value of the parameter measured by sensors 102.

The operation of first input equalization circuit 202 for INPUT1 will be described herein in detail. Input equalization circuits 204, 206, and 208 operate identically, and accordingly, the operation of input equalization circuits 204, 206, and 208 is not described in detail herein. Each input equalization circuit 202, 204, 206, and 208 equalizes an associated input signal to substantially eliminate steady-state offsets and/or bias differences between the different input signals.

First input signal equalization circuit 202 outputs an equalized signal EQS1 to a five-input mid-value selection circuit 210. Similarly, signal equalization circuits 204, 206, and 208 respectively output equalized signals EQS2, EQS3, and EQS4 to five input mid-value selection circuit 210. Five input mid-value selection circuit 210 selects one of EQS1, EQS2, EQS3, EQS4, and a fifth signal PVO to be an output signal OUTPUT that is the output of system 200, as described in more detail below.

First input signal equalization circuit 202 includes an adder 220 that adds a negative value to (i.e., subtracts) a delayed equalization signal DEQ1 from the previous frame to INPUT1 to produce equalized signal EQS1. The equalized signal EQS1 is input to an adder 222 that subtracts output signal OUTPUT from equalized signal EQS1 to produce a dynamic tracking error DTE1 for first input signal equalization circuit 202.

An equalization rate limiter 224 receives the dynamic tracking error DTE1 and limits it to within a range defined by a variable equalization rate calculated by a variable equalization calculation circuit 226. The variable equalization rate limits the rate at which signal INPUT1 is equalized. Alternatively, equalization rate limiter 224 may limit the dynamic tracking error DTE1 within a rate defined by a static equalization rate. An equalization rate limited signal is output from equalization rate limiter 224 to an adder 228.

Adder 228 subtracts an equalization rate limited tracking signal ETR from the equalization rate limited signal and adds delayed equalization signal DEQ1 to the equalization rate limited signal to produce equalization signal EQ1. A delay circuit 230 outputs delayed equalization signal DEQ1, which is simply the equalization signal EQ1 from the previous frame. Delayed equalization signal DEQ1 is input to adder 220 and to adder 228. In the exemplary embodiment, frames have a frequency of approximately 80 Hz (i.e., each frame has a period of approximately 12.5 milliseconds). Alternatively, frames of system 200 have any frequency/period that enables system 200 to function as described herein.

As shown in FIG. 2, mid-value selection circuit 210 receives equalized input signals EQS1, EQS2, EQS3, and EQS4. Five-input mid-value selection circuit 210 also receives a previous frame voted output signal PVO. For the first frame of operation, the previous frame voted output signal PVO is set to zero. When all four input signals EQS1, EQS2, EQS3, and EQS4 are determined to be valid by a static and dynamic fault detection circuit 240, mid-value selection circuit 210 selects the median (i.e., middle) signal of the five signals (i.e., ESQ1, EQS2, EQS3, EQS4, and PVO) as the output signal OUTPUT. That is, the signal that has a value greater than two of the other signals and less than two of the other signals is selected as OUTPUT. Accordingly, for each frame, system 200 produces OUTPUT as the signal that is most likely to be representative of the actual value of the parameter measured by sensors 102 (shown in FIG. 1).

Output signal OUTPUT is also transmitted through a delay circuit 242 to generate previous frame voted output signal PVO. Output signal OUTPUT is also transmitted back into adder 222 in input signal equalization circuits 202, 204, 206, and 208. Mid-value selection circuit 210, as described herein, facilitates suppressing common mode oscillatory acceleration and angular rate output from sensors 102 from reaching output signal OUTPUT and other signals and/or functions downstream from system 200. That is, common mode oscillations produced by local structural flex and/or vibration modes of a shelf supporting sensors 102 are suppressed from reaching output signal OUTPUT.

System 200 includes an equalization target circuit 250 that calculates an equalization target signal ET from input signals INPUT1, INPUT2, INPUT3, and INPUT4. In the exemplary embodiment, equalization target circuit 250 calculates equalization target signal ET as the average of the middle two input signals. For example, if INPUT1, INPUT2, INPUT3, and INPUT4 have values of 1, 4, 5, and 6, respectively, the calculated equalization target signal ET will be (4+5)/2, or 4.5. Alternatively, equalization target circuit 250 may calculate equalization target signal ET using any other method that enables system 200 to function as described herein.

An adder 252 subtracts the output signal OUTPUT from the equalization target signal ET. To produce equalization rate limited tracking signal ETR, the output of adder 252 is limited by an equalization rate limiter 254 within a range defined by a variable equalization rate as calculated by a variable equalization calculation circuit 256. The equalization rate limited tracking signal ETR is supplied into each of input signal equalization circuits 202, 204, 206, and 208, to ensure that the output signal OUTPUT tracks (or is equal to) the equalization target signal ET in steady state conditions, and to smooth transitions in the output signal OUTPUT after any input signal has been detected as failed and isolated from the output selection and equalization target processing.

Static and dynamic fault detection circuit 240 detects faults in four input signals INPUT1, INPUT2, INPUT3, and INPUT4 based on equalization signals EQ1, EQ2, EQ3, and EQ4, and dynamic tracking error signals DTE1, DTE2, DTE3, and DTE4. When fault detection circuit 240 detects a fault, fault detection circuit 240 outputs an isolation signal and a fail signal. The isolation signal is supplied into equalization target circuit 250 and mid-value selection circuit 210 so that the appropriate signals can be isolated from the calculation of equalization target signal ET and the selection of output signal OUTPUT, respectively. The fail signal may be used to alert an operator of the fault by triggering for example, an alarm and/or visual or audio indicator.

For example, if INPUT1 is determined to be a fault, fault detection circuit 240 outputs isolation signal ISOL1 and fail signal FAIL1. When equalization target circuit 250 receives ISOL1, input signal INPUT1 is no longer used to calculate the equalization target signal ET. When mid-value selection circuit 210 receives ISOL1, equalized input signal EQS1 is no longer used to select the output signal OUTPUT. In the exemplary embodiment, when one equalized input signal is isolated, mid-value selection circuit 210 selects the median of the remaining three equalized input signals as the output signal OUTPUT. Further, when one input signal is isolated, equalization target circuit 250 selects the median of the remaining three unequalized input signals as equalization target signal ET Fault detection circuit 240 also receives in-line validity signals VALID1, VALID2, VALID3, and VALID4, associated with input signals INPUT1, INPUT2, INPUT3, and INPUT4. The in-line validity signals VALID1, VALID2, VALID3, and VALID4 are indicative of an input signal failure (e.g., accelerometer or angular rate gyro failure) detected by self-monitoring in the associated source sensor 102. The in-line validity signals VALID1, VALID2, VALID3, and VALID4 are filtered through a specified persistence time before the signal is indicated as failed and isolated from the output selection and equalization target processing.

If a particular input signal is to be inhibited, even though the input signal may not be faulty, the appropriate validity signal is switched to an inhibit signal (e.g., VALID1 becomes INHIBIT1). Accordingly, an input signal may be inhibited if the signal is lost as a result of higher level monitoring (e.g., data bus transmission monitoring), or when the associated sensor 102 is operating in a mode in which the input signal is unavailable. For example, when a groundspeed of the aircraft is less than twenty knots, a track angle measured by first IRU 108, first AHRU 110, second IRU 112, and/or second AHRU 114 may be represented as "No Computed Data". When fault detection circuit 240 receives an inhibit signal, fault detection circuit 240 generates an isolation signal that immediately isolates the associated input signal from the calculation of equalization target signal ET and the selection of output signal OUTPUT. Further, the inhibit signal is not subjected to fault detection processing by fault detection circuit 240.

Figure 3:
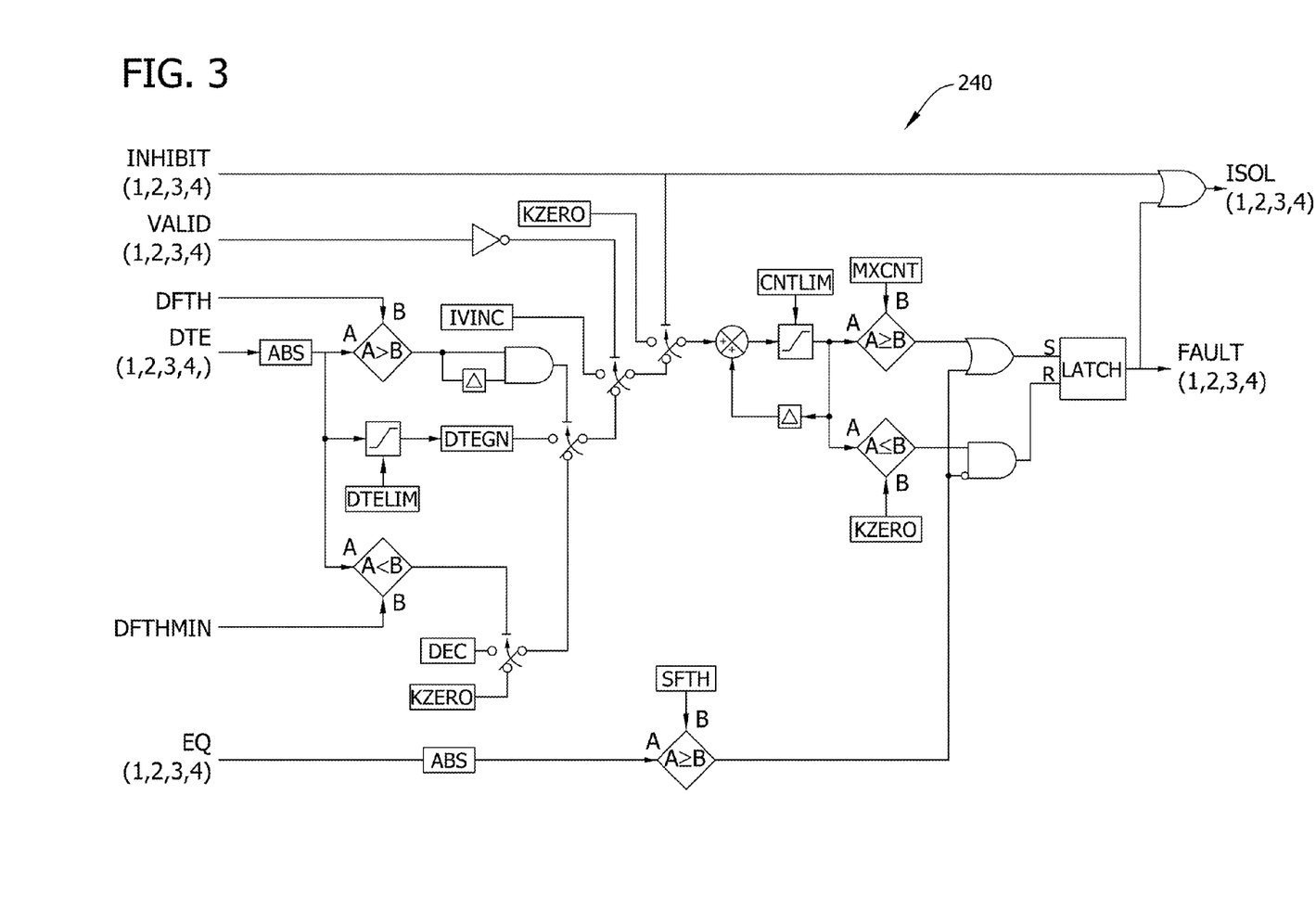
FIG. 3 is block diagram of an exemplary static and dynamic fault detection circuit that may be used with the SSFD system shown in FIG. 2.

FIG. 3 is block diagram of an exemplary static and dynamic fault detection circuit 240 that may be used with SSFD system 200 (shown in FIG. 2). Fault detection circuit 240 operates similar to the fault detection and isolation blocks described in U.S. Pat. No. 5,710,776.

In fault detection circuit 240, each input signal is monitored against the output signal OUTPUT using both static and dynamic fault detection.

For static fault detection, fault detection circuit 240 determines a signal failure when the magnitude of equalization for the particular signal exceeds a static fault threshold. In the exemplary embodiment, the static fault threshold is set at the expected worst case discrepancy between any two input signals in absence of failure, due to the combined effects of null bias and gain error.

For dynamic fault detection, fault detection circuit 240 enables detection of higher frequency (e.g., hardover, oscillatory) failures. The dynamic tracking error signals DTE1, DTE2, DTE3, and DTE4 are each compared against a dynamic fault threshold, and a fault is detected when the threshold is exceeded for a specific time-magnitude persistence time.

Figure 4:
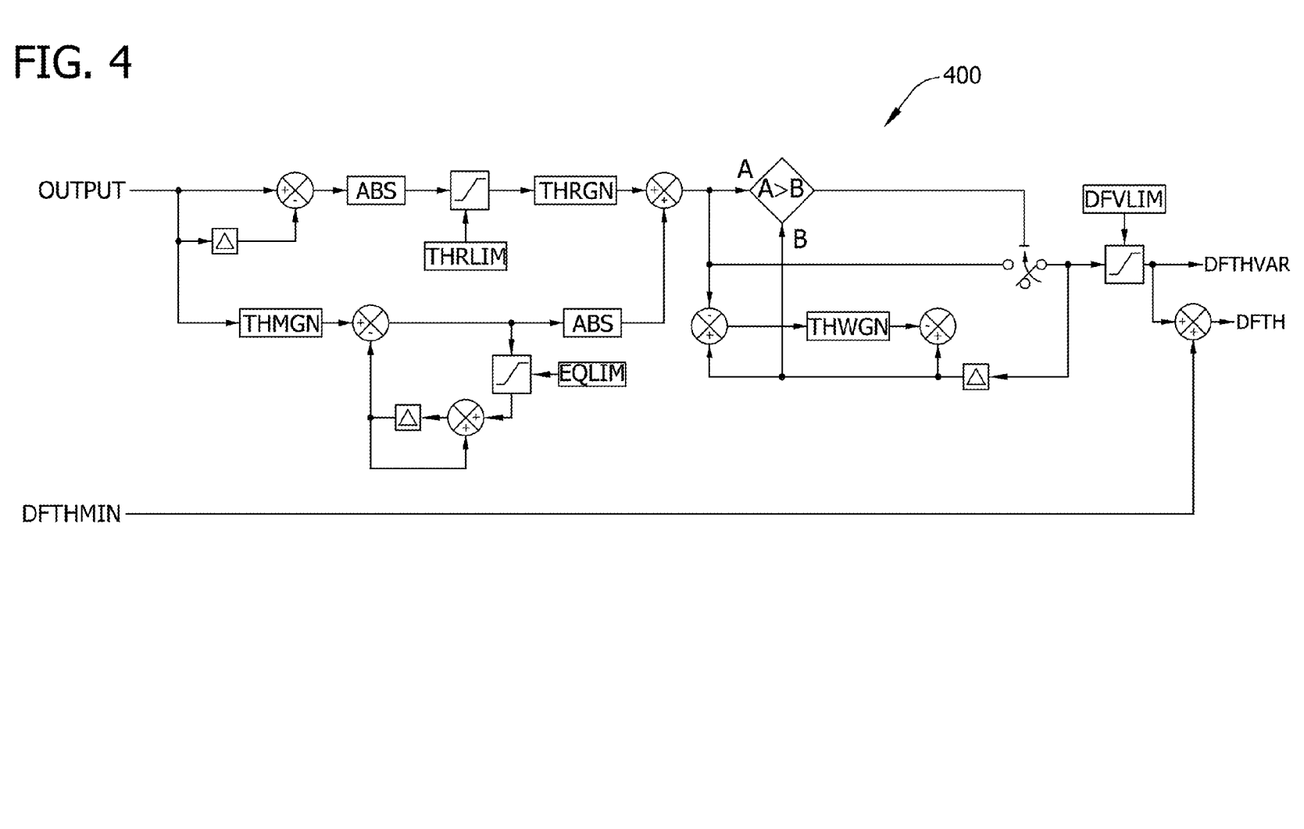
FIG. 4 is a block diagram of an exemplary variable threshold calculation circuit 400 that may be used with the SSFD system shown in FIG. 3.

FIG. 4 is a block diagram of an exemplary variable threshold calculation circuit 400 that may be used with SSFD system 200 (shown in FIG. 2). Variable threshold calculation circuit 400 operates similar to the variable threshold calculation circuit described in U.S. Pat. No. 5,710,776. See, for example, FIG. 11 of U.S. Pat. No. 5,710,776. For applications in which a nominal dynamic fault threshold is smaller than expected deviation between input signals, the dynamic fault threshold can be temporarily increased to accommodate the increased deviation. In the exemplary embodiment, the dynamic fault threshold is increased as a function of a rate and magnitude of output signal OUTPUT.

Figure 5:
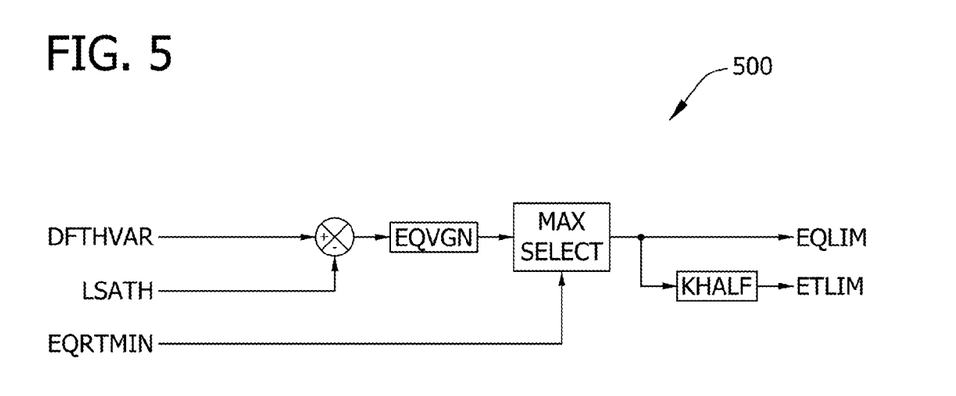
FIG. 5 is a block diagram of an equalization rate calculation circuit that may be used to calculate variable equalizations rates for use the SSFD system shown in FIG. 2.

FIG. 5 is a block diagram of an equalization rate calculation circuit 500 that may be used to calculate variable equalizations rates for use in SSFD system 200. Equalization rate calculation circuit 500 operates similar to the equalization rate calculation circuit described in U.S. Pat. No. 5,710,776. See, for example, FIG. 9 of U.S. Pat. No. 5,710,776. Similar to the dynamic fault threshold, the equalization rates in system 200 can be temporarily increased to more quickly equalize the input signals INPUT1, INPUT2, INPUT3, and INPUT4. For example, in some embodiments, it may be advantageous to increase the equalization rates when static differences between input signals change due to gain effects, which may occur when the magnitude of the input signals INPUT1, INPUT2, INPUT3, and INPUT4 and/or output signal OUTPUT experiences a significant change.

Figure 6:
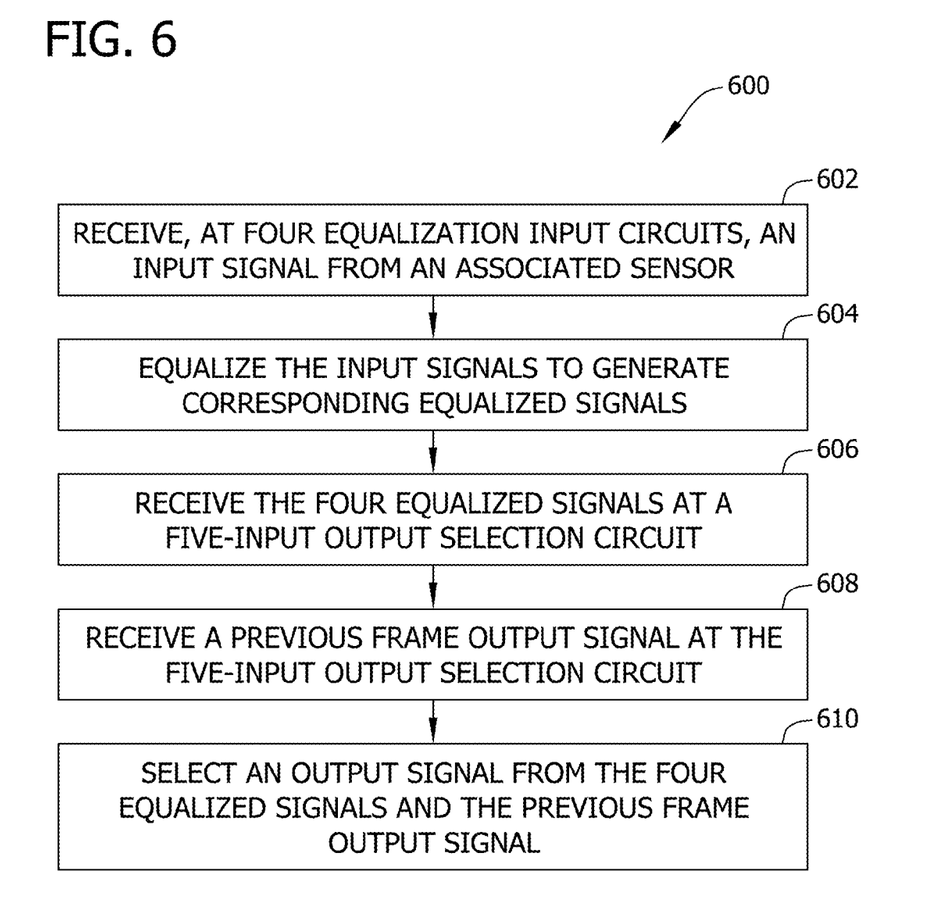
FIG. 6 is flowchart of an exemplary method for use in selecting an output signal.

FIG. 6 is a flowchart of an exemplary method 600 for use in selecting an output signal, such as output signal OUTPUT. Each of four input equalization circuits, such as input equalization circuits 202, 204, 206, and 208 (all shown in FIG. 2), receives 602 an input signal from an associated sensor, such as sensor 102 (shown in FIG. 1). The input signal received at each equalization circuit is indicative of a parameter measured by the associated sensor. Each input signal is equalized 604 to generate a corresponding equalized signal.

A five-input output selection circuit, such as mid-value selection circuit 210 (shown in FIG. 2), receives 606 the four equalized signals. The five-input output selection circuit also receives 608 a previous frame output signal. The five-input output selection circuit selects 610 the output signal from one of the four equalized signals and the previous frame output signal.

Figure 7:
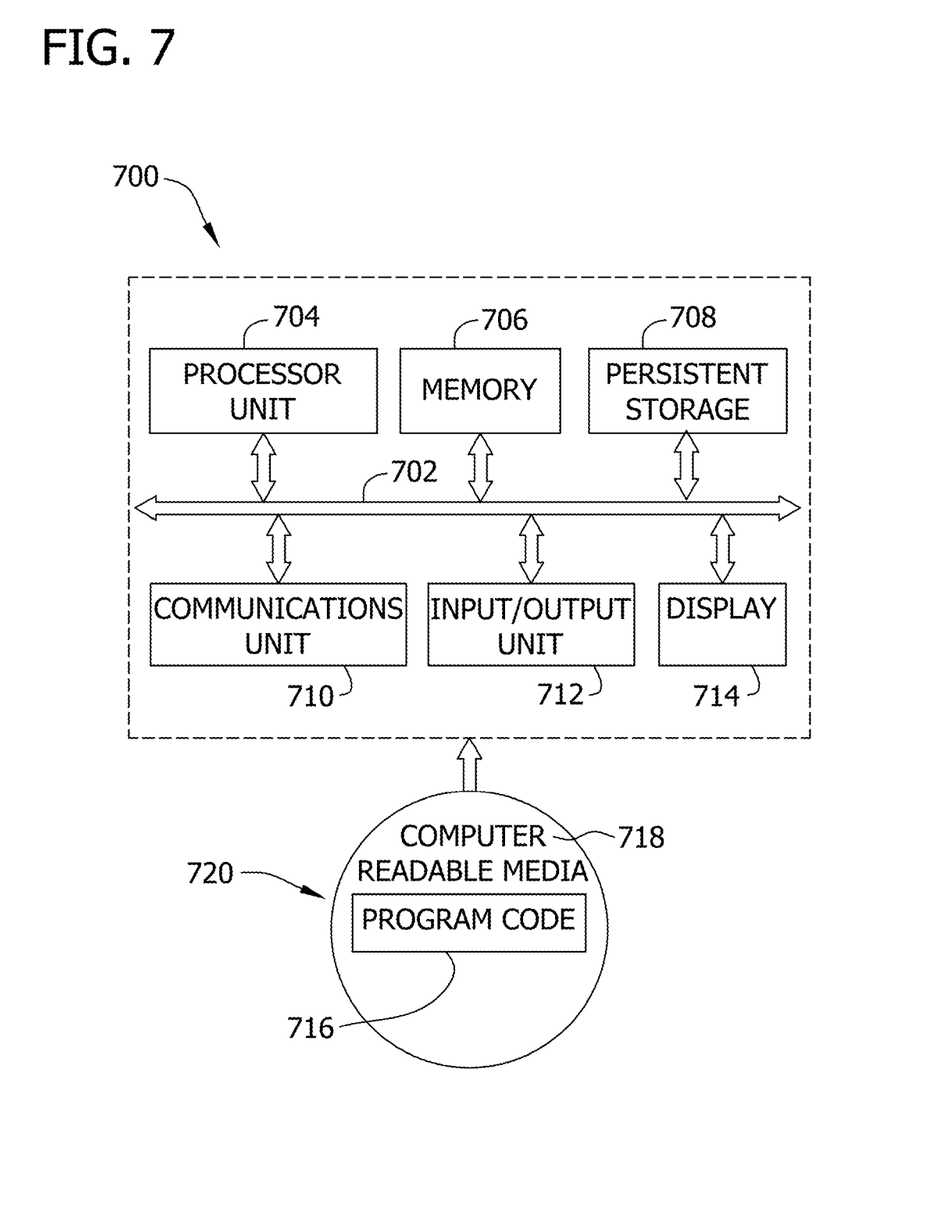
FIG. 7 is a diagram of an exemplary data processing system.

Although generally described in terms of logic circuits herein, the systems and methods described herein may be implemented as instructions embodied on a non-transitory computer-readable medium. For example, FIG. 7 is a diagram of an exemplary data processing system 700 that may be used in implementing one or more of the embodiments described herein. In the exemplary embodiment, data processing system 700 includes communications fabric 702, which enables communications between processor unit 704, memory 706, persistent storage 708, communications unit 710, input/output (I/O) unit 712, and display 714.

Processor unit 704 serves to execute instructions for software that may be loaded into memory 706. Processor unit 704 may be a set of one or more processors or may be a multi-processor core, depending on the particular implementation. Further, processor unit 704 may be implemented using one or more heterogeneous processor systems in which a main processor is present with secondary processors on a single chip.

In another illustrative example, processor unit 704 may be a symmetric multi-processor system that contains multiple processors. Further, processor unit 704 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

Memory 706 and persistent storage 708 are examples of storage devices. A storage device is any piece of hardware that is capable of storing information either on a temporary basis and/or a permanent basis. Memory 706, in these examples, may be, for example, without limitation, a random access memory or any other suitable volatile or non-volatile storage device. Persistent storage 708 may take various forms depending on the particular implementation.

For example, without limitation, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, without limitation, a removable hard drive may be used for persistent storage 708. Persistent storage 708 may also include so-called "cloud" storage.

Communications unit 710, in these examples, provides for communications with other data processing systems or devices. In these examples, communications unit 710 is a network interface card. Communications unit 710 may provide communications through the use of either or both physical and wireless communication links.

Input/output unit 712 enables input and output of data with other devices that may be connected to data processing system 700. For example, without limitation, input/output unit 712 may provide a connection for user input through a keyboard and mouse. Further, input/output unit 712 may output to a printer. Display 714 provides a mechanism to display information to a user.

Instructions for the operating system and applications or programs are located on persistent storage 708. These instructions may be loaded into memory 706 for execution by processor unit 704. The processes of the different embodiments may be performed by processor unit 704 using computer implemented instructions, which may be located in a memory, such as memory 706. These instructions are referred to as program code, computer usable program code, or computer readable program code that may be read and executed by a processor in processor unit 704. The program code in the different embodiments may be embodied on different physical or tangible computer readable media, such as memory 706 or persistent storage 708.

Program code 716 is located in a functional form on computer readable media 718 that is selectively removable and may be loaded onto or transferred to data processing system 700 for execution by processor unit 704. Program code 716 and computer readable media 718 form computer program product 720 in these examples. In one example, computer readable media 718 may be in a tangible form, such as, for example, an optical or magnetic disc that is inserted or placed into a drive or other device that is part of persistent storage 708 for transfer onto a storage device, such as a hard drive that is part of persistent storage 708. In a tangible form, computer readable media 718 also may take the form of a persistent storage, such as a hard drive, a thumb drive, or a flash memory that is connected to data processing system 700. The tangible form of computer readable media 718 is also referred to as computer recordable storage media. In some instances, computer readable media 718 may not be removable.

Alternatively, program code 716 may be transferred to data processing system 700 from computer readable media 718 through a communications link to communications unit 710 and/or through a connection to input/output unit 712. The communications link and/or the connection may be physical or wireless in the illustrative examples. The computer readable media also may take the form of non-tangible media, such as communications links or wireless transmissions containing the program code.

In some illustrative embodiments, program code 716 may be downloaded over a network to persistent storage 708 from another device or data processing system for use within data processing system 700. For instance, program code stored in a computer readable storage medium in a server data processing system may be downloaded over a network from the server to data processing system 700. The data processing system providing program code 716 may be a server computer, a client computer, or some other device capable of storing and transmitting program code 716.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown.

In one example, a storage device in data processing system 700 is any hardware apparatus that may store data. Memory 706, persistent storage 708, and computer readable media 718 are examples of storage devices in a tangible form.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 706 or a cache such as that found in an interface and memory controller hub that may be present in communications fabric 702.

The embodiments described herein enable selection of an output signal that is most likely to be representative of an actual value of a parameter measured by a plurality of sensors. The signal selection and fault detection (SSFD) system described herein includes four input equalization circuits that each equalize an input signal received from an associated sensor. The four equalized signals are received at a five-input output selection circuit, along with a previous frame output signal. The five-input output selection circuit selects an output signal for the SSFD system from one of the four equalized signals and the previous frame output signal.

Unlike at least some known redundant channel signal processing systems, the SSFD system and methods described herein detect and selectively isolate faulty signals from a signal selection process, even during a common mode failure in which a plurality of signals fail simultaneously. Further, in contrast to at least some known redundant channel signal processing systems, the SSFD system and methods described herein prevent oscillatory failures in one or more sensors from reaching an output signal. Finally, the SSFD systems and methods described herein enable signal selection and fault detection processing in sensor systems that include four sensors.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A signal selection and fault detection system comprising:
    four input equalization circuits each configured to:
        receive an input signal from an associated sensor, wherein the input signal is indicative of a parameter measured by the associated sensor, and wherein the associated sensor is installed onboard an aircraft; and
        output an equalized signal based on the received input signal; and
    a five-input output selection circuit coupled to said four input equalization circuits and configured to:
        receive an equalized signal from each of said four input equalization circuits, said five-input output selection circuit configured to;
        receive a previous frame output signal; and
        select an output signal from the four equalized signals and the previous frame output signal to control operation of the aircraft.

2. A signal selection and fault detection system in accordance with claim 1, wherein said five-input output selection circuit is configured to select a median signal of the four equalized signals and the previous frame output signal as the output signal.

3. A signal selection and fault detection system in accordance with claim 1, further comprising an equalization target calculation circuit configured to:
    receive the four input signals; and
    calculate an equalization target signal based on the four input signals.

4. A signal selection and fault detection system in accordance with claim 3, wherein said equalization target calculation circuit is configured to calculate an average of two middle signals of the four input signals as the equalization target signal.

5. A signal selection and fault detection system in accordance with claim 1, further comprising a fault detection circuit configured to detect whether any of the four input signals is faulty.

6. A signal selection and fault detection system in accordance with claim 5, wherein said five-input output selection circuit is configured to isolate an equalized signal from the output selection when said fault detection circuit detects that an input signal associated with the equalized signal is faulty.

7. A signal selection and fault detection system in accordance with claim 1, wherein each of said four input equalization circuits is configured to receive an input signal from at least one of an inertial reference unit and an attitude and heading reference unit.

8. A sensor system onboard an aircraft, said sensor system comprising:
    four sensors each configured to measure an operational parameter and produce an input signal indicative of the measured parameter; and
    a signal selection and fault detection system coupled to said four sensors and comprising:
        four input equalization circuits each configured to:
            receive the input signal from an associated sensor of said four sensors; and
            output an equalized signal based on the received input signal; and
        a five-input output selection circuit coupled to said four input equalization circuits, said five-input output selection circuit configured to:
            receive an equalized signal from each of said four input equalization circuits;
            receive a previous frame output signal; and
            select an output signal from the four equalized signals and the previous frame output signal to control operation of the aircraft.

9. A sensor system in accordance with claim 8, wherein said four sensors comprise two inertial reference units and two attitude and heading reference units.

10. A sensor system in accordance with claim 8, wherein said four sensors are each configured to measure at least one of a body acceleration, an angular rate, a pitch attitude, a roll attitude, a groundspeed, a track angle, and a heading of the aircraft.

11. A sensor system in accordance with claim 8, wherein said five-input output selection circuit is configured to select a median signal of the four equalized signals and the previous frame output signal as the output signal.

12. A sensor system in accordance with claim 8, wherein said signal selection and fault detection system further comprises an equalization target calculation circuit configured to:
   receive the four input signals; and
   calculate an equalization target signal based on the four input signals.

13. A sensor system in accordance with claim 12, wherein said equalization target calculation circuit is configured to calculate an average of two middle signals of the four input signals as the equalization target signal.

14. A sensor system in accordance with claim 8, wherein said signal selection and fault detection system further comprises a fault detection circuit configured to detect whether any of the four input signals is faulty.

15. A method of selecting an output signal comprising:
   receiving, at each of four input equalization circuits, an input signal from an associated sensor, the input signal indicative of a parameter measured by the associated sensor, the associated sensor installed onboard an aircraft;
   equalizing each of the input signals to generate a corresponding equalized signal;
   receiving, at a five-input output selection circuit, each of the four equalized signals;
   receiving, at the five-input output selection circuit, a previous frame output signal;
   selecting, using the five-input output selection circuit, an output signal from the four equalized signals and the previous frame output signal; and
   controlling operation of the aircraft based on the selected output signal.

16. A method in accordance with claim 15, wherein selecting an output signal comprises selecting a median signal of the four equalized signals and the previous frame output signal as the output signal.

17. A method in accordance with claim 15, further comprising calculating an equalization target signal based on the four input signals, wherein equalizing each of the input signals comprises equalizing each of the input signals based on the calculated equalization target signal.

18. A method in accordance with claim 17, wherein calculating an equalization target signal comprises calculating an average of two middle signals of the four input signals as the equalization target signal.

19. A method in accordance with claim 15, wherein receiving an input signal comprises receiving an input signal from one of an inertial reference unit and an attitude and heading reference unit.

20. A method in accordance with claim 15, wherein receiving an input signal comprises receiving an input signal indicative of one of a body acceleration, an angular rate, a pitch attitude, a roll attitude, a groundspeed, a track angle, and a heading of the aircraft.

* * * * *